(12) United States Patent
Singh

(10) Patent No.: US 10,085,022 B1
(45) Date of Patent: *Sep. 25, 2018

(54) TWO-DIMENSIONAL TRANSFORMATION WITH MINIMUM BUFFERING

(71) Applicant: Ambarella, Inc., Santa Clara, CA (US)

(72) Inventor: Manish K. Singh, Mountain House, CA (US)

(73) Assignee: Ambarella, Inc., Santa Clara, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 15/210,169

(22) Filed: Jul. 14, 2016

Related U.S. Application Data

(63) Continuation of application No. 14/257,243, filed on Apr. 21, 2014, now Pat. No. 9,426,434.

(51) Int. Cl.
| | |
|---|---|
| *G06F 17/16* | (2006.01) |
| *H04N 19/122* | (2014.01) |
| *H04N 19/13* | (2014.01) |
| *H04N 19/167* | (2014.01) |
| *H04N 19/176* | (2014.01) |
| *H04N 19/18* | (2014.01) |
| *H04N 19/48* | (2014.01) |

(52) U.S. Cl.
CPC .......... *H04N 19/122* (2014.11); *G06F 17/16* (2013.01); *H04N 19/13* (2014.11); *H04N 19/167* (2014.11); *H04N 19/176* (2014.11); *H04N 19/18* (2014.11); *H04N 19/48* (2014.11)

(58) Field of Classification Search
None
See application file for complete search history.

(56) References Cited

U.S. PATENT DOCUMENTS

| | | | |
|---|---|---|---|
| 4,768,159 A | 8/1988 | Gray | 708/405 |
| 5,771,392 A | 6/1998 | Razdow | 708/607 |
| 6,181,831 B1 | 1/2001 | Sadjadian | 375/E7.226 |
| 6,421,695 B1 | 7/2002 | Bae | 708/402 |
| 9,426,434 B1* | 8/2016 | Singh | H04N 19/60 |
| 2004/0122887 A1 | 6/2004 | Macy | 708/607 |
| 2005/0141776 A1 | 6/2005 | Dang | 382/250 |
| 2011/0307685 A1 | 12/2011 | Song | 712/16 |
| 2014/0365548 A1* | 12/2014 | Mortensen | G06F 9/3001 708/523 |

* cited by examiner

*Primary Examiner* — David H Malzahn
(74) *Attorney, Agent, or Firm* — Christopher P. Maiorana, PC

(57) ABSTRACT

An apparatus includes a first circuit and a second circuit. The first circuit may be configured to (i) generate a sequence of intermediate matrices by multiplying an original matrix by a predetermined matrix and (ii) write the intermediate matrices into a memory in a first order that alternates between a row order and a column order. The second circuit may be configured to generate a given matrix by reading the intermediate matrices from the memory in a second order that alternates between the column order and the row order.

20 Claims, 13 Drawing Sheets

US 10,085,022 B1

TWO-DIMENSIONAL TRANSFORMATION WITH MINIMUM BUFFERING

This application relates to U.S. Ser. No. 14/257,243, filed Apr. 21, 2014, now U.S. Pat. No. 9,426,434, which is incorporated by reference in its entirety.

FIELD OF THE INVENTION

The present invention relates to video codecs generally and, more particularly, to a two-dimensional transformation with minimum buffering.

BACKGROUND OF THE INVENTION

In an H.265 high efficiency video coding (i.e., HEVC) codec, a block of data is conventionally transformed and quantized prior to an entropy coding. An inverse transform is performed prior to reconstruction and display of the data block. Transform sizes of 4×4, 8×8, 16×16 and 32×32 are included in an H.265 encoding to find which block size leads to a better quality of encoding. The transform operations compute a two-dimensional transform T mathematically represented by formula 1 as follows:

$$T = A \cdot X \cdot A^T \quad (1)$$

where "·" indicates matrix multiplication. The matrix A may be a coefficient matrix and the matrix X may be either a spatial domain residue matrix or a frequency domain transform coefficient matrix. The matrix $A^T$ is a transpose of the matrix A. All of the matrices are 4×4, 8×8, 16×16 or 32×32, depending upon the size of the transform.

It would be desirable to implement a two-dimensional transformation with minimum buffering.

SUMMARY OF THE INVENTION

The present invention concerns an apparatus including a first circuit and a second circuit. The first circuit may be configured to (i) generate a sequence of intermediate matrices by multiplying an original matrix by a predetermined matrix and (ii) write the intermediate matrices into a memory in a first order that alternates between a row order and a column order. The second circuit may be configured to generate a given matrix by reading the intermediate matrices from the memory in a second order that alternates between the column order and the row order.

The objects, features and advantages of the present invention include providing a two-dimensional transformation with minimum buffering that may (i) reduce a size of a memory buffering intermediate values compared with conventional designs, (ii) utilize matrix multiplication circuitry at 100 percent, (iii) reduce power consumption compared with conventional designs and/or (iv) be implemented in hardware alone.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Figure 1:
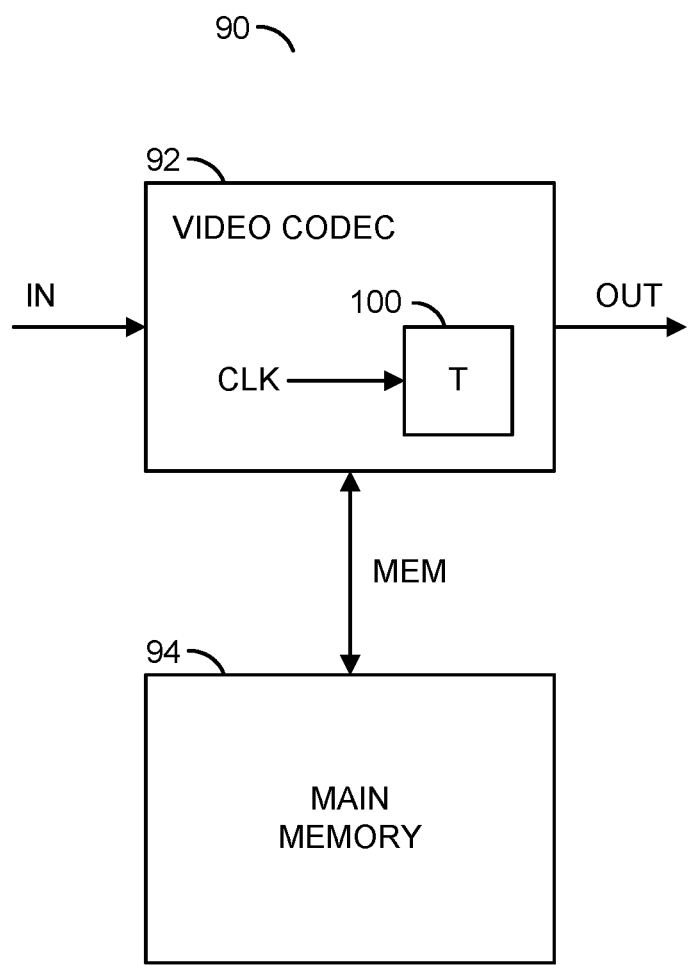
FIG. 1 is a block diagram of an apparatus.

In high speed digital systems, such as video encoding and video decoding systems, a block transformation operation (e.g., formula 1) between the spatial domain and the frequency domain may be broken in two sub-operations. An approach for the two sub-operation transform is presented in formulae 2 and 3 as follows:

$$Y = A \cdot X \quad (2)$$

$$T = Y \cdot A^T \quad (3)$$

Another approach for the two sub-operation transform is presented in formulae 4 and 5 as follows:

$$Y = X \cdot A^T \quad (4)$$

$$T = A \cdot Y \quad (5)$$

where "·" indicates matrix multiplication. The matrix X may be either a spatial domain residue matrix or a frequency domain transform coefficient matrix. The matrix Y is generally an intermediate matrix. The matrix T may be the transformed matrix. The matrix A may be a coefficient matrix. The matrix $A^T$ is generally a transpose of the matrix A. In various embodiments, all of the matrices may be a square matrix (e.g., 4×4, 8×8, 16×16 or 32×32, depending upon the size of the transform and the code standard being implemented).

The coefficient matrix A is generally a fixed matrix or a programmable matrix. A block of data in the matrix X may be read from a system memory in multiple cycles, depending upon the available read bandwidth. The intermediate matrix Y is computed by either formulae 2 or 4 in an initial stage and stored in a temporary buffer (or memory circuit). Once a complete matrix Y is computed, another stage of computation for formulae 3 or 5 may begin. The transform matrix T (which is k rows per cycle where k may be 1 to n, and n is a transform unit size) may be fed to quantization logic in an encoder configuration or adder logic in a decoder configuration.

Address sequences used in writing into and reading from the storage buffer may be transposed after every complete access of the block. A complete access generally uses n/k cycles of the transform circuitry. The addressing transposition after every block of write and read from the storage buffer generally allows a high performance of the transform operations with no bubbles in the throughput of the transform operations. Various embodiments may achieve 100 percent throughput in the transform operations with a single block of temporary storage for a single intermediate matrix Y.

Referring to FIG. 1, a block diagram of an example implementation of an apparatus 90 is shown. The apparatus (or circuit or device or integrated circuit) 90 may implement a video encoder and/or a video decoder. The apparatus 90 generally comprises a block (or circuit) 92 and a block (or circuit) 94. The circuits 92-100 may be implemented in hardware, software, firmware or any combination thereof in an apparatus (or device). In some embodiments, the apparatus 90 may be a digital video camera, a digital still camera or a hybrid digital video/still camera.

The circuit 92 may be directly coupled with the circuit 94 to exchange data and control information in a bidirectional signal (e.g., MEM). An input signal (e.g., IN) may be received by the circuit 92. An output signal (e.g., OUT) may be presented by the circuit 92. A signal (e.g., CLK) may be received by the circuit 100. The signal CLK generally conveys a system clock.

Where the apparatus 90 is configured as an encoder, the signal IN generally carries an uncompressed and unencoded video, and the signal OUT conveys a compressed and encoded video bitstream. Where the apparatus 90 is configured as a decoder, the signal IN may carry the compressed and encoded video bitstream, and the signal OUT may convey the uncompressed and unencoded video.

The unencoded/decoded signal IN or OUT may be one or more analog video signals and/or one or more digital video signals. The unencoded signal generally comprises a sequence of progressive-format frames and/or interlace-format fields. The unencoded signal may include synchronization signals suitable for synchronizing the video information. The unencoded signal may be presented in analog form as, but not limited to, an RGB (Red, Green, Blue) signal, an EIA-770 (e.g., YCrCb) signal, an S-video signal and/or a composite video baseband signal (e.g., CVBS). In digital form, the unencoded signal may be presented as, but is not limited to, a high definition multimedia interface (e.g., HDMI) signal, a digital video interface (e.g., DVI) signal and/or a BT.656 signal. The unencoded signal may be formatted as a standard definition signal or a high definition signal.

The encoded signal IN or OUT generally conveys compressed and encoded video. The encoded signal is generally referred to as a bitstream. The encoded signal may comprise a sequence of progressive-format frames and/or interlace-format fields. The encoded signal may be compliant with a VC-1, MPEG and/or H.26x standard. The MPEG/H.26x standards generally include H.263, H.264, H.265, MPEG-1, MPEG-2 and MPEG-4. The MPEG standards may be defined by the Moving Pictures Expert Group, International Organization for Standards, Geneva, Switzerland. The H.26x standards may be defined by the International Telecommunication Union-Telecommunication Standardization Sector, Geneva, Switzerland. The VC-1 standard may be defined by the document Society of Motion Picture and Television Engineer (SMPTE) 421M-2006, by the SMPTE, White Plains, N.Y.

The circuit 92 may be implemented as a video digital signal processor (e.g., VDSP) circuit. The circuit 92 may be operational to perform digital video encoding operations and/or digital video decoding operations on the data received in the signal IN. The circuit 92 generally comprises multiple digital signal processors (or cores).

Encoding operations performed by the circuit 92 may include, but are not limited to, the following. The video received in the signal IN may be divided into blocks. A motion estimation is generally performed for a current block being encoded as an inter-frame/field block. A reference block is generated based on the results of the motion estimation. A residual block may be created by subtracting the reference block from the current block. The residual block is transformed by the circuit 92 (e.g., the circuit 100) from a spatial domain to a frequency domain. The resulting transform coefficients are quantized and subsequently entropy encoded. The compressed and encoded data is presented in the signal OUT.

Decompressing and decoding operations performed by the circuit 92 may include, but are not limited to the following. The encoded data received in the signal IN may be entropy decoded to recover the quantized transform coefficients. An inverse quantization and/or scaling is performed to recover approximations of the original transform coefficients. The recovered transform coefficients are transformed from the frequency domain to the spatial domain by the circuit 92 (e.g., the circuit 100) to recover a residual block. The circuit 92 generates a reference block, which is added to the residual block to recreate the block. Filtering may be performed on the recreated block prior to storage in memory and/or presentation for display.

The circuit 92 may be fabricated as an integrated circuit in (on) a single chip (or die). In some embodiments, the circuits 92 and 94 may be fabricated in (on) the same chip. In other embodiments, the circuits 92 and 94 may be fabricated in (on) separate chips.

The circuit 94 may be implemented as a dynamic random access memory (e.g., DRAM). The circuit 94 may be operational to store or buffer large amounts of information consumed and generated by the encoding/decoding operations of the apparatus 90. As such, the circuit 94 may be referred to as a main (or external) memory. The circuit 94 may be implemented as a double data rate (e.g., DDR) memory. Other memory technologies may be implemented to meet the criteria of a particular application. The circuit 94 may be fabricated as an integrated circuit in (on) a single chip (or die). In some embodiments, the circuits 92 and 94 may be fabricated in (on) separate chips.

The circuit 100 may implement a transform circuit. The circuit 100 is generally operational to transform the matrices received in the signal IN between the spatial domain and the frequency domain. In encoding operations, the transform may be from the spatial domain to the frequency domain. In decoding operations, the transform may be from the frequency domain into the spatial domain. The transform may form part of an H.265 decoding and/or encoding operations. In some embodiments, the circuit 100 may be implemented in only hardware for high speed operations.

The transform operations performed by the circuit 100 may include, but are not limited to the following. The circuit 100 may generate a sequence of intermediate matrices by multiplying a sequence of original matrices by a predetermined matrix (e.g., see formulae 2 or 4). The intermediate matrices may be written into a memory in a given order that alternates between (i) an intermediate matrix in a row order and (ii) another intermediate matrix in a column order. The intermediate matrices are generally read from the memory in another order that alternates between (i) the intermediate matrix in the column order and (ii) the other intermediate matrix in the row order. The circuit 100 may also generate a sequence of transform matrices by multiplying the intermediate matrices as read from the memory by another predetermined matrix (e.g., see formulae 3 or 5).

Figure 2:
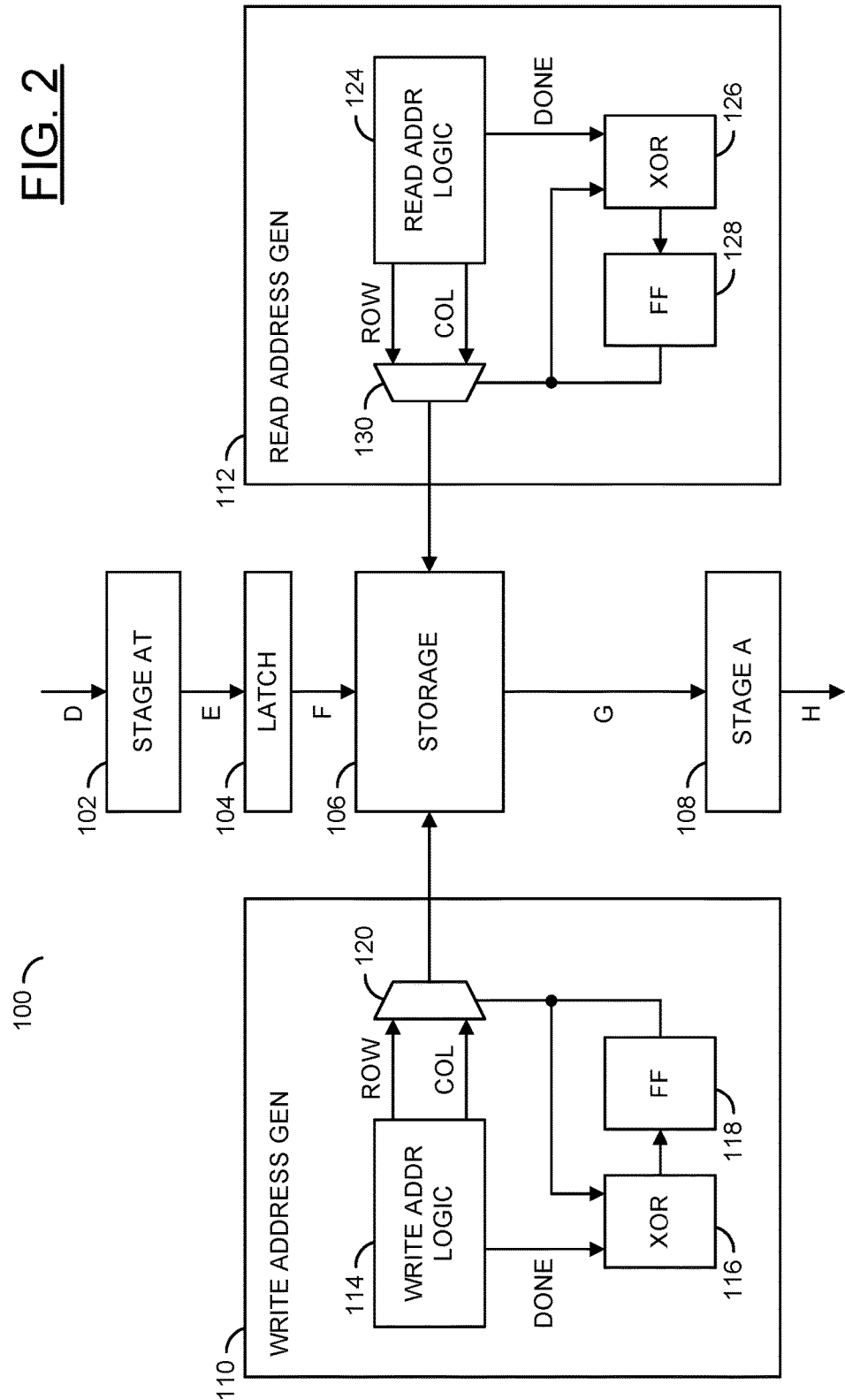
FIG. 2 is a block diagram of a transform circuit in accordance with a preferred embodiment of the present invention.

Referring to FIG. 2, a block diagram of the circuit 100 is shown in accordance with a preferred embodiment of the present invention. The circuit (or apparatus or module) 100 generally comprises a block (or circuit) 102, a block (or circuit) 104, a block (or circuit) 106, a block (or circuit) 108, a block (or circuit) 110, and a block (or circuit) 112. The circuit 110 generally comprises a block (or circuit) 114, a block (or circuit) 116, a block (or circuit) 118, and a block (or circuit) 120. The circuit 112 generally comprises a block (or circuit) 124, a block (or circuit) 126, a block (or circuit) 128, and a block (or circuit) 130. The circuits 102-130 may be implemented in hardware, software, firmware or any combination thereof in an apparatus (or device).

The circuit 102 may implement an initial transform stage (e.g., stage AT) circuit. The circuit 102 is generally operational to generate a sequence of intermediate matrices Y by multiplying a sequence of original matrices X received in a signal (e.g., D) by a predetermined matrix (e.g., the matrix A per formula 2 or the matrix $A^T$ per formula 4). Generation of each portion (or unit) of the intermediate matrices Y is generally performed within one or more clock cycles of the circuit 100, depending on the size of each matrix X. For example, each portion of 4×4 and 8×8 matrices X may be transformed in a single clock cycle. Larger matrices X generally use multiple clock cycles in a pipeline fashion. At the end of each clock cycle, a new portion of an intermediate matrix Y may be presented in a signal (e.g., E).

The circuit 104 may implement a latch circuit. The circuit 104 is generally operational to temporarily store (or buffer) the portions of the intermediate matrices Y received in the signal E, one or more portions at a time. The buffered matrix Y may be presented in a signal (e.g., F). In some embodiments, the circuit 104 may be part of the circuit 102. In other embodiments, the circuit 104 may be separate from the circuit 102.

The circuit 106 may implement a storage circuit (or memory). The circuit 106 is generally operational to temporarily store (or buffer) a full intermediate matrix Y or portions of two intermediate matrices Y at a time. A storage size (or capacity) of the circuit 106 may be designed to match a size (or number of elements) of an intermediate matrix Y (e.g., store an n×n matrix). In some embodiments, multiple rows/columns in at least two of the intermediate matrices Y may be written into the circuit 106 in consecutive cycles.

The circuit 108 may implement another transform stage (e.g., stage A) circuit. The circuit 108 is generally operational to generate a sequence of the transform matrices T by multiplying the intermediate matrices Y received in a signal (e.g., G) by another predetermined matrix (e.g., $A^T$ per formula 3 or matrix A per formula 5). Generation of each portion (or unit) of the transform matrix T is generally performed within one or more clock cycle of the circuit 100, depending on the size of each intermediate matrix Y. For example, each portion of 4×4 and 8×8 intermediate matrices Y may be transformed in a single clock cycle. Larger intermediate matrices Y generally use multiple clock cycles in a pipeline fashion. At the end of each clock cycle, a new portion of the transform matrix T may be presented in a signal (e.g., H).

The circuit 110 may implement a write address generation circuit. The circuit 110 may be operational to generate an address signal used by the circuit 106 to write units (e.g., a column or a row) of the intermediate matrices Y. The circuit 114 generally creates a sequence of addresses used for the writes. Once the address sequence is complete for a full matrix write, a signal (e.g., DONE) may be asserted. An exclusive OR gate 116 combines the signal DONE with an output of the flip-flop 118. The flip-flop 118 toggles between a row order of the write addresses and a column order of the write addresses based on the output of the gate 116. The multiplexer 120 routes either row-order addresses or column-order addresses from the circuit 114 to the circuit 106 based on the state of the flip-flop 118. In some embodiments, the circuit 110 may be part of the circuit 102. In other embodiments, the circuit 110 may be separate from the circuit 102.

The circuit 112 may implement a read address generation circuit. The circuit 112 may be operational to generate an address signal used by the circuit 106 to read units of the intermediate matrices Y. The circuit 124 generally creates a sequence of addresses used for the reads. Once the address sequence is complete for a full matrix, another signal DONE may be asserted. An exclusive OR gate 126 combines the signal DONE with an output of the flip-flop 128. The flip-flop 128 toggles between a row order of the read addresses and a column order of the read addresses based on the output of the gate 126. The multiplexer 130 routes either row-order addresses or column-order addresses from the circuit 124 to the circuit 106 based on the state of the flip-flop 128. In some embodiments, the circuit 112 may be part of the circuit 108. In other embodiments, the circuit 112 may be separate from the circuit 108.

Figure 3:
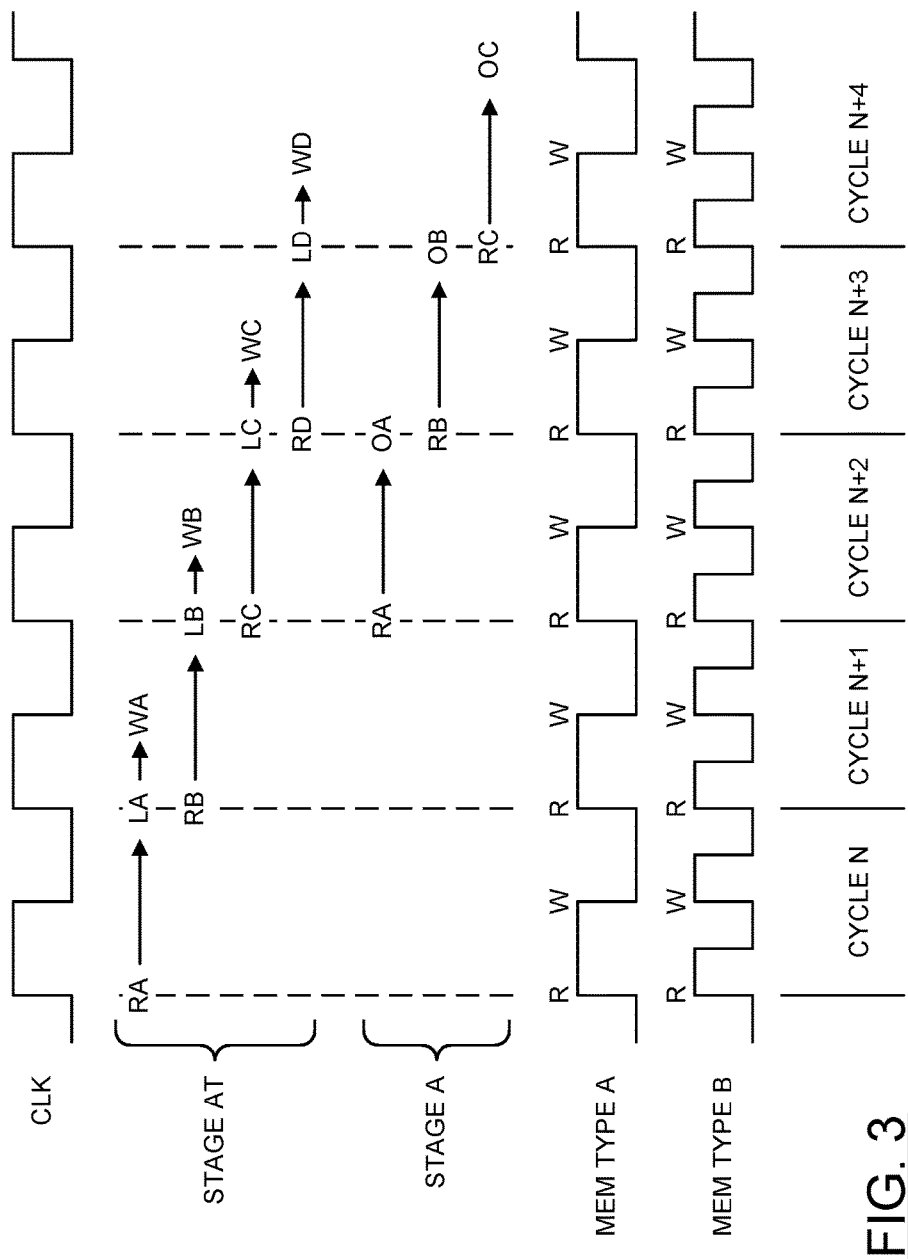
FIG. 3 is a diagram of example waveforms.

Referring to FIG. 3, a diagram of example waveforms is shown. The signal CLK is illustrated as a square wave. The signal CLK generally establishes a sequence of cycles (e.g., cycle N to N+4 as shown) for the circuit 100. Various duty cycles may be implemented in the signal CLK to meet the criteria of a particular application.

By way of example, a transformation of a sequence of four units A-D of an original matrix X is shown. The circuit 102 may receive an original matrix unit $X_A$ in the signal D (e.g., RA) at a beginning of a cycle N (e.g., on a rising edge of the signal CLK). The stage AT operations of the circuit 102 may generate an intermediate matrix unit $Y_A$ during the cycle N. The intermediate matrix unit $Y_A$ is latched (e.g., LA) into the circuit 104 at the end of the cycle N (e.g., on the next rising edge of the signal CLK). The intermediate matrix unit $Y_A$ in the circuit 104 is generally written (e.g., WA) into the circuit 106 during the next cycle N+1 (e.g., on a subsequent falling edge of the signal CLK).

A next original matrix unit $X_B$ may be received (e.g., RB) by the circuit 102 at the start of the next cycle N+1. At the end of the cycle N+1, the next intermediate matrix unit $Y_B$ is latched (e.g., LB) into the circuit 104. The intermediate matrix unit $Y_B$ is written from the circuit 104 to the circuit 106 (e.g., WB) during the cycle N+2.

Another original matrix unit $X_C$ is generally received (e.g., RC) and another intermediate matrix unit $Y_C$ latched (e.g., LC) at the start and the end of the cycle N+2, respectively. The intermediate matrix unit $Y_C$ is subsequently written into the circuit 106 (e.g., WC) during the cycle N+3.

Another original matrix unit $X_D$ is generally received (e.g., RD) and another intermediate matrix unit $Y_D$ latched (e.g., LD) at the start and the end of the cycle N+3, respectively. The intermediate matrix unit $Y_D$ is subsequently written into the circuit 106 (e.g., WD) during the cycle N+4.

The circuit 108 may read the intermediate matrix unit $Y_A$ from the circuit 106 (e.g., RA) at the beginning of the cycle N+2. The resulting transform matrix unit $T_A$ may be presented in the signal H out of the circuit 108 (e.g., OA) by the end of the cycle N+2.

The intermediate matrix unit $Y_B$ may be read from the circuit 106 (e.g., RB) at the start of the cycle N+3. The resulting transform matrix unit $T_B$ may be presented out of the circuit 108 (e.g., OB) by the end of the cycle N+3.

Another intermediate matrix unit $Y_C$ may be read from the circuit 106 (e.g., RC) at the start of the cycle N+4. The resulting transform matrix unit $T_C$ may be presented out of the circuit 108 (e.g., OC) by the end of the cycle N+4. Processing of the intermediate matrix units Y as read from the circuit 106 may continue in subsequent cycles.

To support the stage AT operations of the circuit 102 and the stage A operations of the circuit 108, the circuit 106 is generally designed to perform both a read and a write in each cycle of the signal CLK. In various embodiments, the circuit 106 may be implemented with a type of memory (e.g., type A) that is designed to read and write on alternating edges of the signal CLK. For example, the type A memory may perform reads on rising edges of the signal CLK and perform writes on falling edges of the signal CLK. In other embodiments, the circuit 106 may operate from an internal clock operating at twice the speed of the signal CLK. Therefore, another type of memory (e.g., type B) may perform the reads on a particular (e.g., the rising) edges and perform the writes on the same particular edges with the reads and writes alternating on every other iteration of the particular edge. Other memory types may be implemented to meet the criteria of a particular application.

Figure 4:
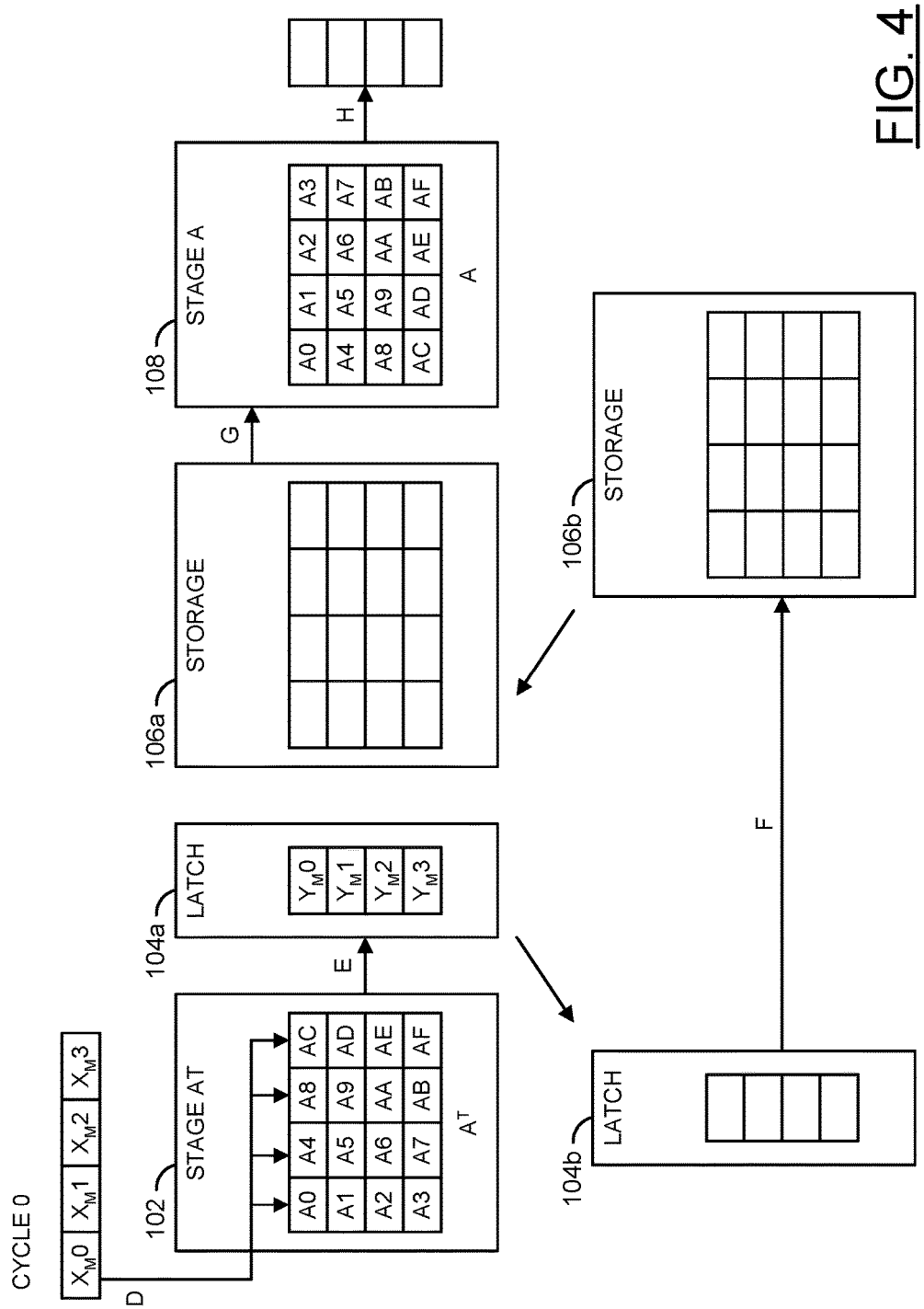
FIG. 4 is a diagram illustrating a cycle 0 of a transformation.

Referring to FIG. 4, a diagram illustrating an example initial cycle (e.g., cycle 0) of a transformation is shown. Cycle by cycle operations are generally shown using a 4×4 transformation with a read bandwidth of a row per cycle. Steps for 8×8, 16×16 and 32×32 transforms may be similar. Transformation operations on rows/columns may be swapped with operations on columns/rows to meet the criteria of a particular application.

At a start of the cycle 0, an initial row of an original matrix $X_M$ may be received by the circuit 102. The initial row of the matrix $X_M$ generally comprises multiple (e.g., 4) elements (e.g., $X_M0$, $X_M1$, $X_M2$ and $X_M3$). An initial unit (e.g., row) of intermediate elements (e.g., $Y_M0$, $Y_M1$, $Y_M2$ and $Y_M3$) is generated during the cycle 0 by multiplying the initial original row by the predetermined matrix A. The initial row of the matrix $Y_M$ may be calculated in cycle 0 per formulae 6 as follows:

$$Y_M0=X_M0*A0+X_M1*A1+X_M2*A2+X_M3*A3 \quad (6)$$

$$Y_M1=X_M0*A4+X_M1*A5+X_M2*A6+X_M3*A7$$

$$Y_M2=X_M0*A8+X_M1*A9+X_M2*AA+X_M3*AB$$

$$Y_M3=X_M0*AC+X_M1*AD+X_M2*AE+X_M3*AF$$

The initial row of the matrix $Y_M$ may be latched into the circuit 104 (e.g., illustrated as 104a) by the end of the cycle 0.

Figure 5:
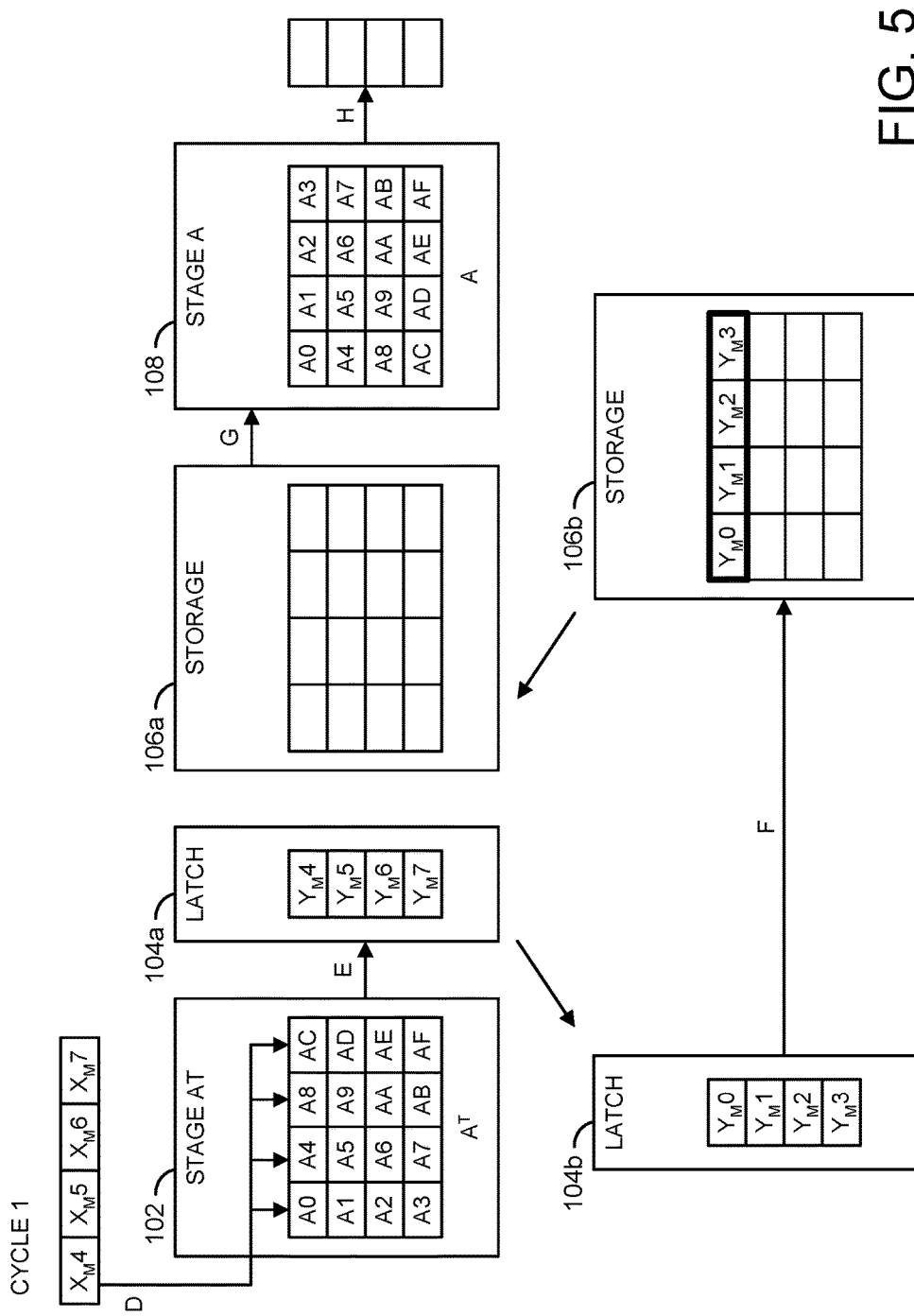
FIG. 5 is a diagram illustrating a cycle 1.

Referring to FIG. 5, a diagram illustrating an example next cycle (e.g., cycle 1) of the transformation is shown. At a start of the cycle 1, a next row (e.g., $X_M4$, $X_M5$, $X_M6$ and $X_M7$) of the original matrix $X_M$ is received. The next row is subsequently processed during the cycle 1 by the circuit 102. A second row of the matrix $Y_M$ may be calculated in cycle 1 per formulae 7 as follows:

$$Y_M4=X_M4*A0+X_M5*A1+X_M6*A2+X_M7*A3 \quad (7)$$

$$Y_M5=X_M4*A4+X_M5*A5+X_M6*A6+X_M7*A7$$

$$Y_M6=X_M4*A8+X_M5*A9+X_M6*AA+X_M7*AB$$

$$Y_M7=X_M4*AC+X_M5*AD+X_M6*AE+X_M7*AF$$

During the cycle 1, the first row of the matrix $Y_M$ buffered in the circuit 104 (e.g., illustrated as 104b) is written into a top row the circuit 106 (e.g., illustrated as 106b). Writing into the circuit 106 may be done in the row order. By the end of the cycle 1, the next intermediate row (e.g., $Y_M4$, $Y_M5$, $Y_M6$ and $Y_M7$) may be buffered in the circuit 104 (e.g., 104a) since the initial intermediate row (e.g., $Y_M0$, $Y_M1$, $Y_M2$ and $Y_M3$) has already been written into the circuit 106.

Figure 6:
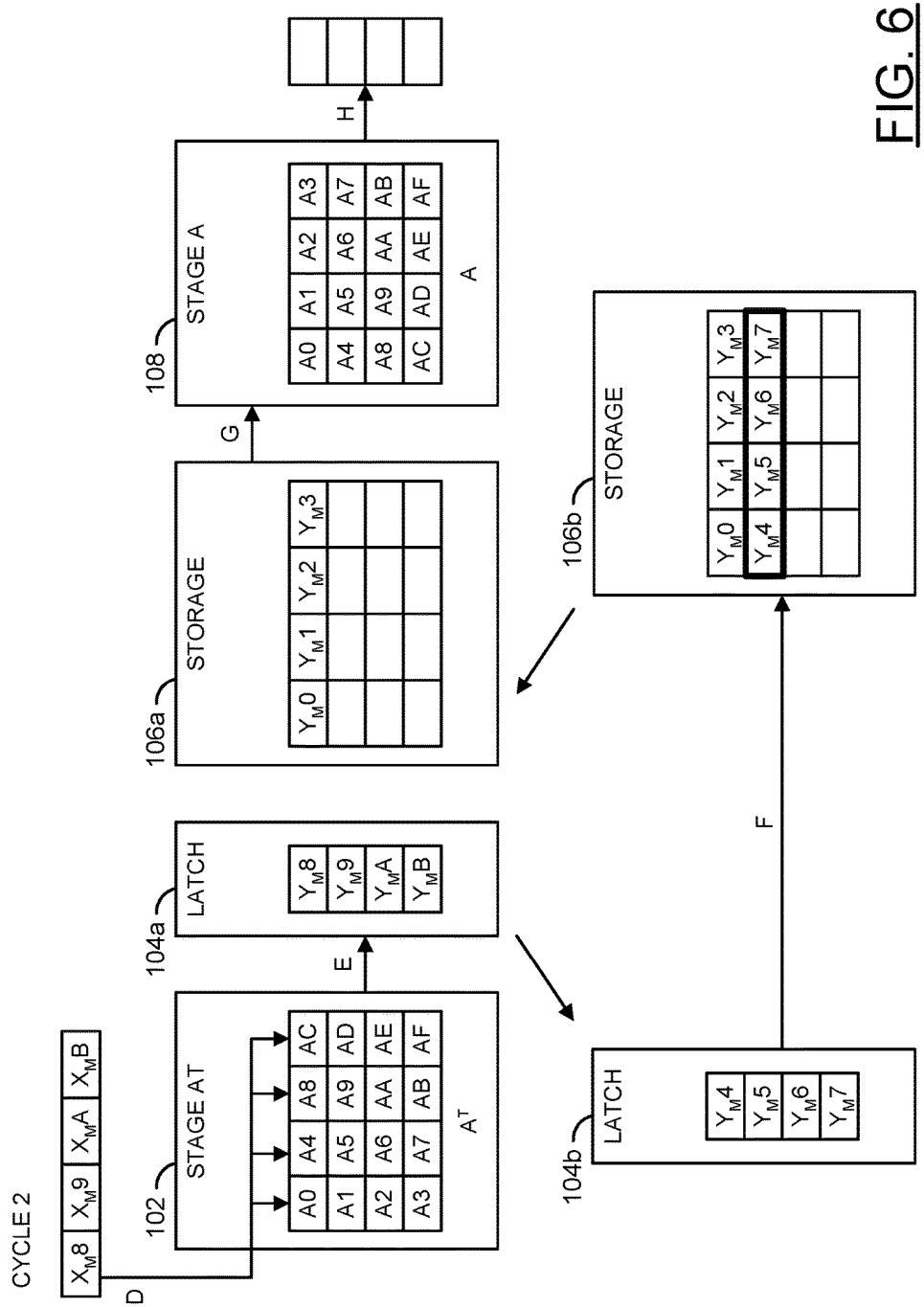
FIG. 6 is a diagram illustrating a cycle 2.

Referring to FIG. 6, a diagram illustrating another cycle (e.g., cycle 2) of the transformation is shown. At a start of the cycle 2, another row of the original matrix $X_M$ is received and processed by the circuit 102. A third row of the matrix $Y_M$ may be calculated in cycle 2 per formulae 8 as follows:

$$Y_M8=X_M8*A0+X_M9*A1+X_MA*A2+X_MB*A3 \quad (8)$$

$$Y_M9=X_M8*A4+X_M9*A5+X_MA*A6+X_MB*A7$$

$$Y_MA=X_M8*A8+X_M9*A9+X_MA*AA+X_MB*AB$$

$$Y_MB=X_M8*AC+X_M9*AD+X_MA*AE+X_MB*AF$$

At the start of the cycle 2, the initial row of the matrix $Y_M$ is already stored in the top row of the circuit 106 (106a).

During the cycle 2, the next intermediate row of the matrix $Y_M$ is written from the circuit 104 (104b) into a next row of the circuit 106 (106b). By the end of the cycle 2, a third intermediate row of the matrix $Y_M$ is buffered in the circuit 104 (104a).

Figure 7:
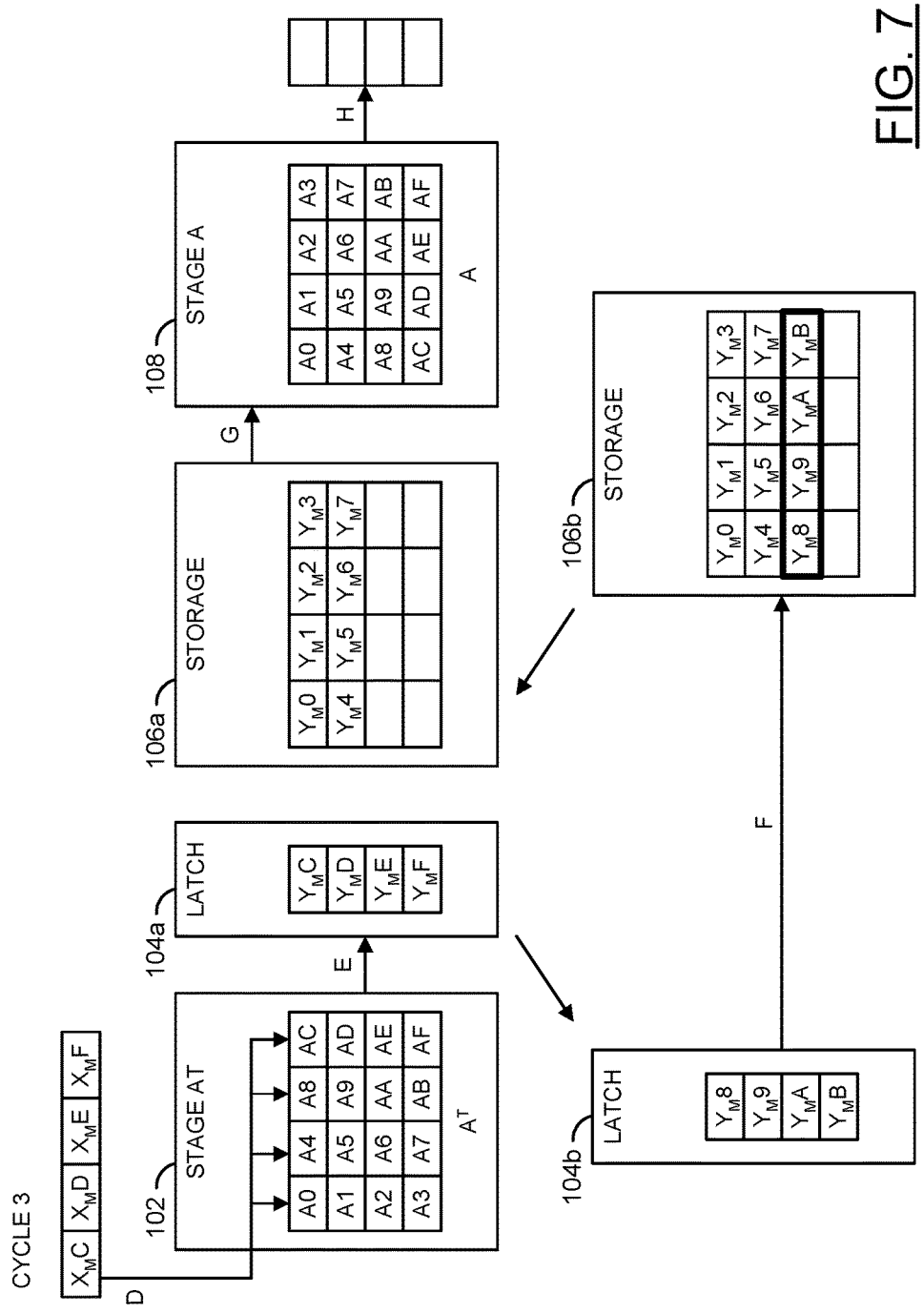
FIG. 7 is a diagram illustrating a cycle 3.

Referring to FIG. 7, a diagram illustrating another cycle (e.g., cycle 3) of the transformation is shown. At a start of the cycle 3, a last row of the original matrix $X_M$ is received and processed by the circuit 102. A fourth row of the intermediate matrix $Y_M$ may be calculated in cycle 3 per formulae 9 as follows:

$$Y_MC=X_MC*A0+X_MD*A1+X_ME*A2+X_MF*A3 \quad (9)$$

$$Y_MD=X_MC*A4+X_MD*A5+X_ME*A6+X_MF*A7$$

$$Y_ME=X_MC*A8+X_MD*A9+X_ME*AA+X_MF*AB$$

$$Y_MF=X_MC*AC+X_MD*AD+X_ME*AE+X_MF*AF$$

At the start of the cycle 3, the first two rows of the intermediate matrix $Y_M$ are already stored in the top two rows of the circuit 106 (106a).

During the cycle 3, the third intermediate row of the matrix $Y_M$ may be written from the circuit 104 (104b) into a third row of the circuit 106 (106b). By the end of the cycle 3, a final row of the intermediate matrix $Y_M$ may be held in the circuit 104 (104a).

The stage AT operations performed by the circuit 102 are generally complete at the end of the cycle 3 for the original matrix $X_M$. No bubbles (e.g., gaps or stalls in the processing) may exist in the stage AT operations. The intermediate matrix $Y_M$ is generally written into the circuit 106 in the row order.

Figure 8:
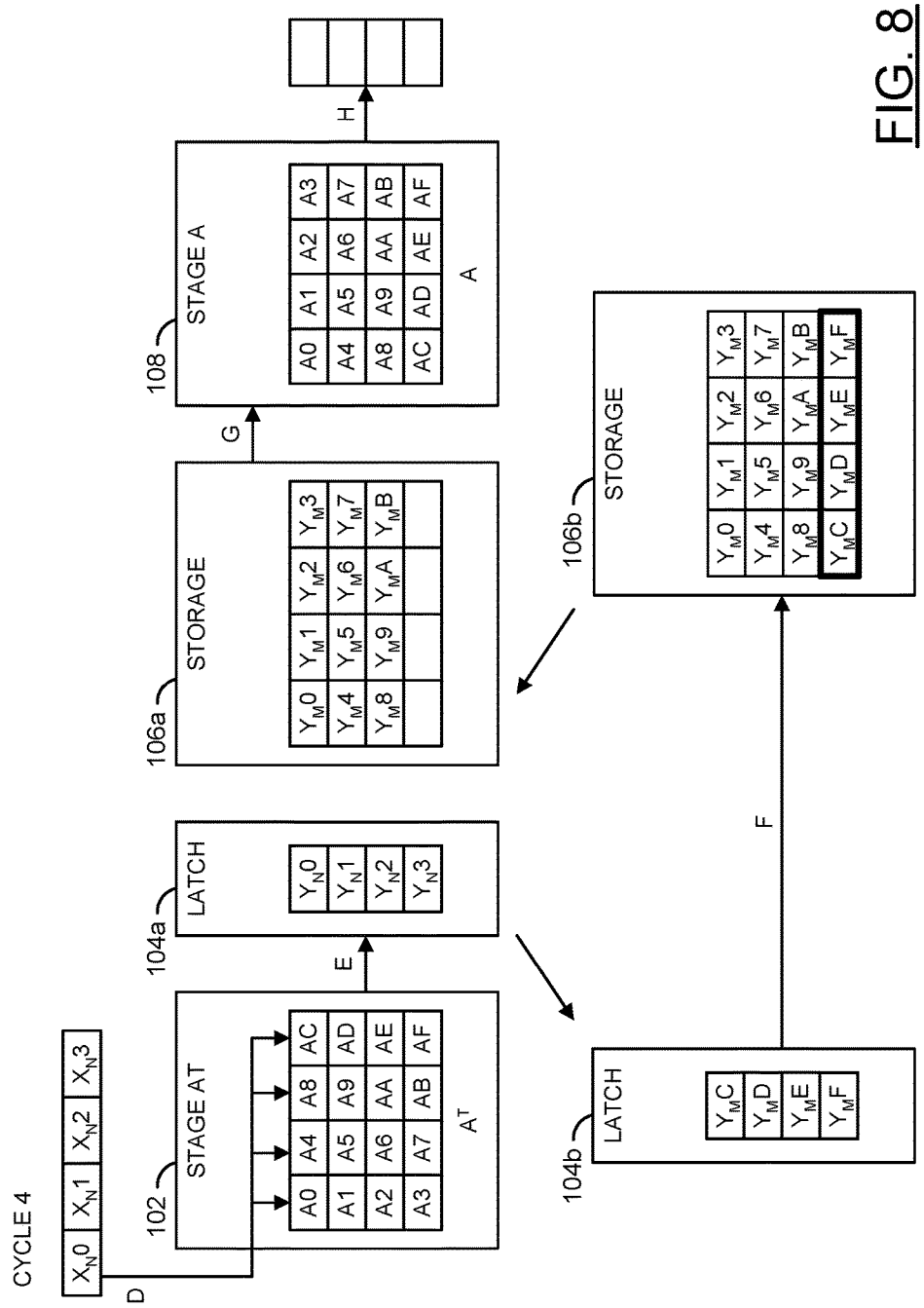
FIG. 8 is a diagram illustrating a cycle 4.

Referring to FIG. 8, a diagram illustrating another cycle (e.g., cycle 4) of the transformation is shown. At a start of the cycle 4, an initial row (e.g., $X_N0$, $X_N1$, $X_N2$ and $X_N3$) of a next original matrix $X_N$ is received and processed by the circuit 102. A first row of the next intermediate matrix $Y_N$ may be calculated in cycle 4 per formulae 10 as follows:

$$Y_N0=X0*A0+X_N1*A1+X_N2*A2+X_N3*A3 \quad (10)$$

$$Y_N1=X0*A4+X_N1*A5+X_N2*A6+X_N3*A7$$

$$Y_N2=X0*A8+X_N1*A9+X_N2*AA+X_N3*AB$$

$$Y_N3=X0*AC+X_N1*AD+X_N2*AE+X_N3*AF$$

At the start of the cycle 4, the first three rows of the intermediate matrix $Y_M$ are already stored in the top three rows of the circuit 106 (106a).

During the cycle 4, the final intermediate row of the matrix $Y_M$ is written from the circuit 104 (104b) into a final row of the circuit 106 (106b). By the end of the cycle 4, an initial row of an intermediate matrix $Y_N$ is stored in the circuit 104 (104a).

Figure 9:
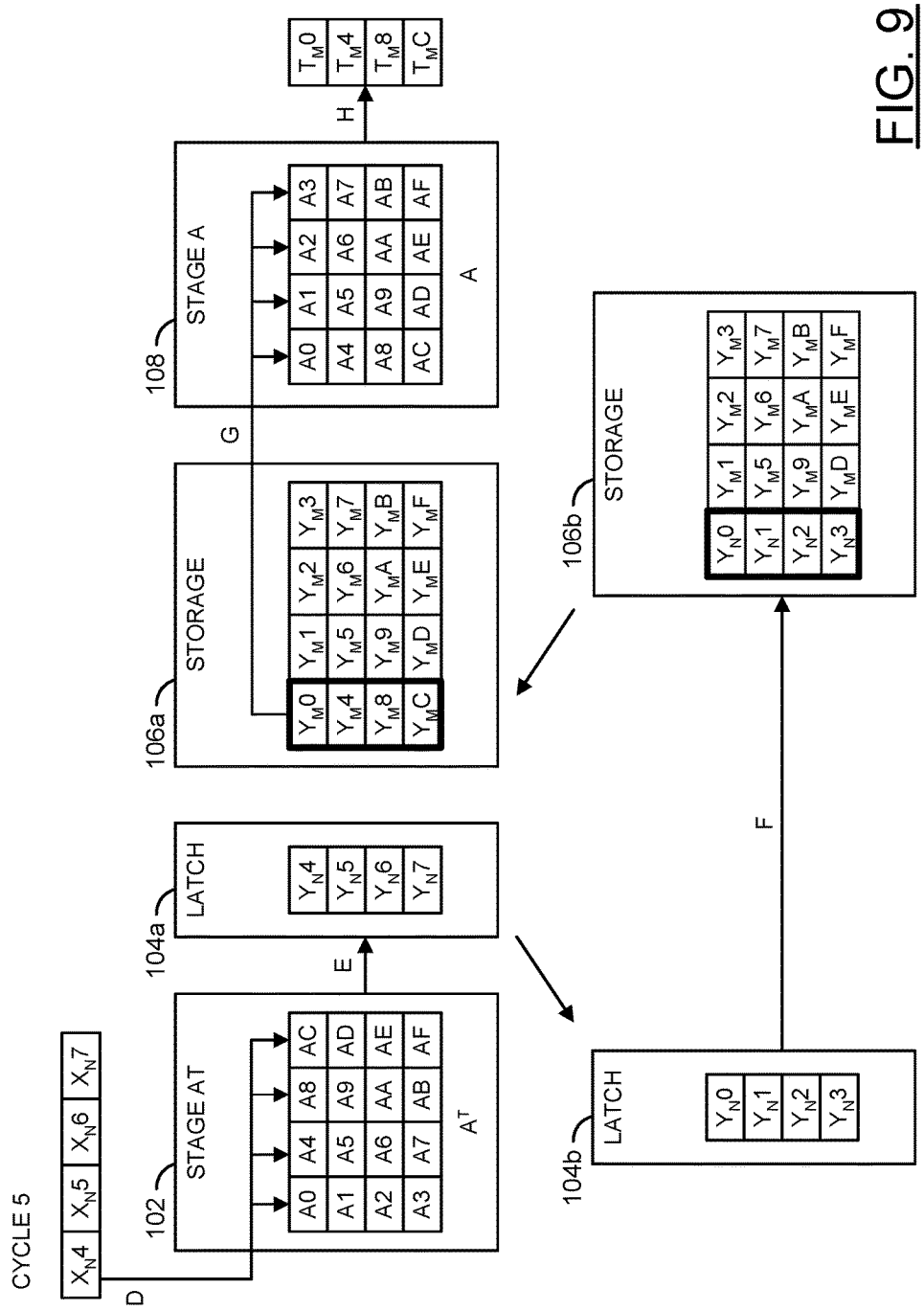
FIG. 9 is a diagram illustrating a cycle 5.

Referring to FIG. 9, a diagram illustrating another cycle (e.g., cycle 5) of the transformation is shown. At a start the cycle 5, a next row of the matrix $X_N$ is received and subsequently processed by the circuit 102. At the start of the cycle 5, the entire intermediate matrix $Y_M$ is already stored in the circuit 106 (106a).

The matrix $Y_M$ may be read from the circuit 106 in the column order. A first column of the intermediate matrix $Y_M$ may be read from a first column of the circuit 106 at the start of the cycle 5 and transferred to the circuit 108.

During the cycle 5, the first row of the intermediate matrix $Y_N$ is written from the circuit 104 (104b) into a first column of the circuit 106 (106b). Writing into the circuit 106 generally switches from the row order for the matrix $Y_M$ to the column order for the matrix $Y_N$.

By the end of the cycle 5, a next intermediate row of the matrix $Y_N$ is held in the circuit 104 (104a). Furthermore, a first unit (e.g., column) of an initial transform matrix $T_M$ is generated by the stage A operations of the circuit 108. The first column of the matrix $T_M$ may be calculated in cycle 5 per formulae 11 as follows:

$$T_M0 = Y_M0*A0 + Y_M4*A1 + Y_M8*A2 + Y_MC*A3 \qquad (11)$$

$$T_M4 = Y_M0*A4 + Y_M4*A5 + Y_M8*A6 + Y_MC*A7$$

$$T_M8 = Y_M0*A8 + Y_M4*A9 + Y_M8*AA + Y_MC*AB$$

$$T_MC = Y_M0*AC + Y_M4*AD + Y_M8*AE + Y_MC*AF$$

Figure 10:
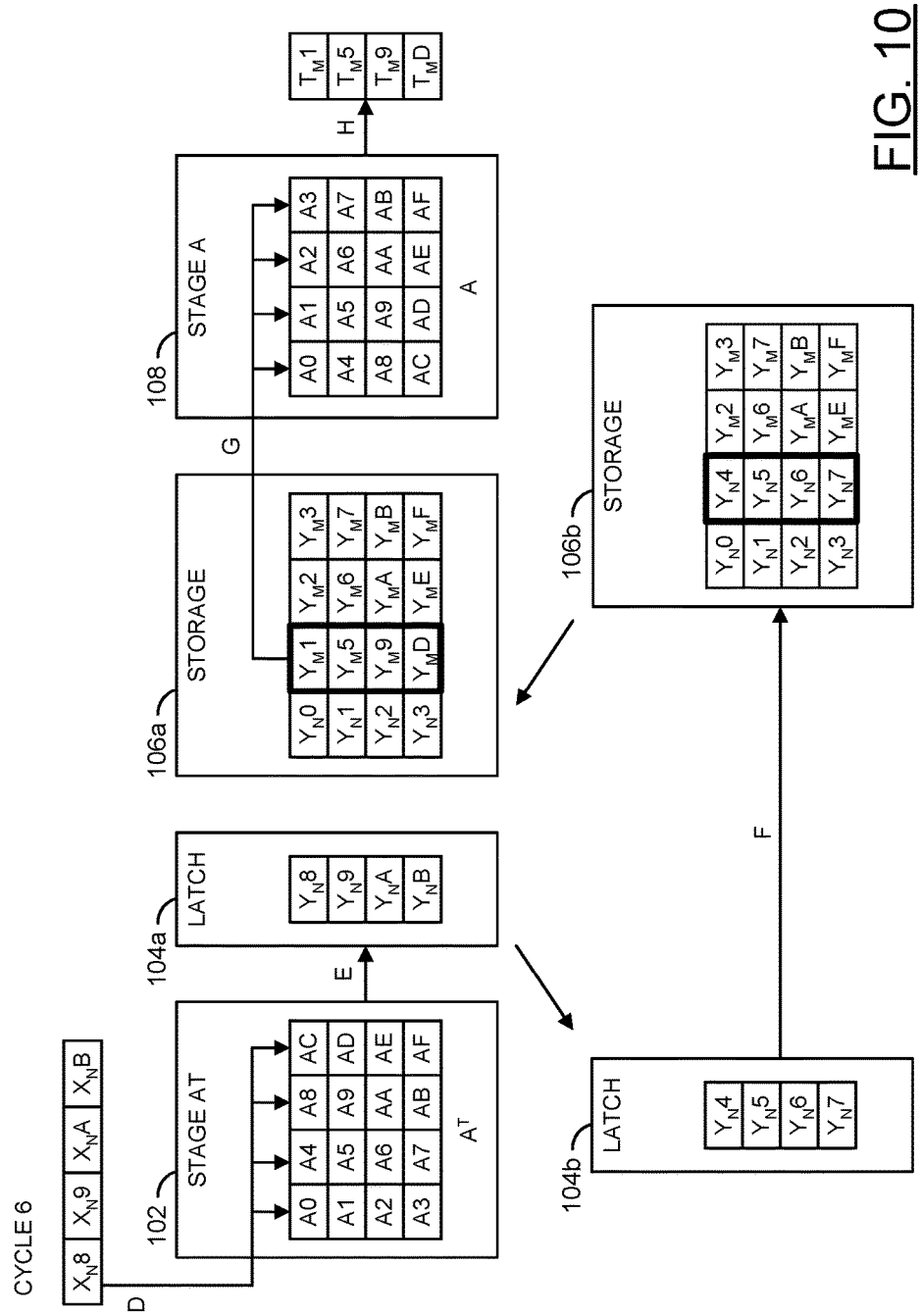
FIG. 10 is a diagram illustrating a cycle 6.

Referring to FIG. 10, a diagram illustrating another cycle (e.g., cycle 6) of the transformation is shown. At a start the cycle 6, a third row of the matrix $X_N$ is received and processed by the circuit 102. At the start of the cycle 6, the first column of the circuit 106 (106a) stores the first row of the intermediate matrix $Y_N$. The next three columns of the circuit 106 (106a) may store the last three columns of the matrix $Y_M$. At the start of the cycle 6, a next column of the intermediate matrix $Y_M$ is read from a next column of the circuit 106 and transferred to the circuit 108.

During the cycle 6, the next row of the intermediate matrix $Y_N$ is written from the circuit 104 (104b) into a next column of the circuit 106 (106b). By the end of the cycle 6, a third intermediate row of the matrix $Y_N$ generated by the circuit 102 is stored in the circuit 104 (104a). By the end of the cycle 6, a next column of the transform matrix $T_M$ is generated by the stage A operations. The second column of the matrix $T_M$ may be calculated in cycle 6 per formulae 12 as follows:

$$T_M1 = Y_M1*A0 + Y_M5*A1 + Y_M9*A2 + Y_MD*A3 \qquad (12)$$

$$T_M5 = Y_M1*A4 + Y_M5*A5 + Y_M9*A6 + Y_MD*A7$$

$$T_M9 = Y_M1*A8 + Y_M5*A9 + Y_M9*AA + Y_MD*AB$$

$$T_MD = Y_M1*AC + Y_M5*AD + Y_M9*AE + Y_MD*AF$$

Figure 11:
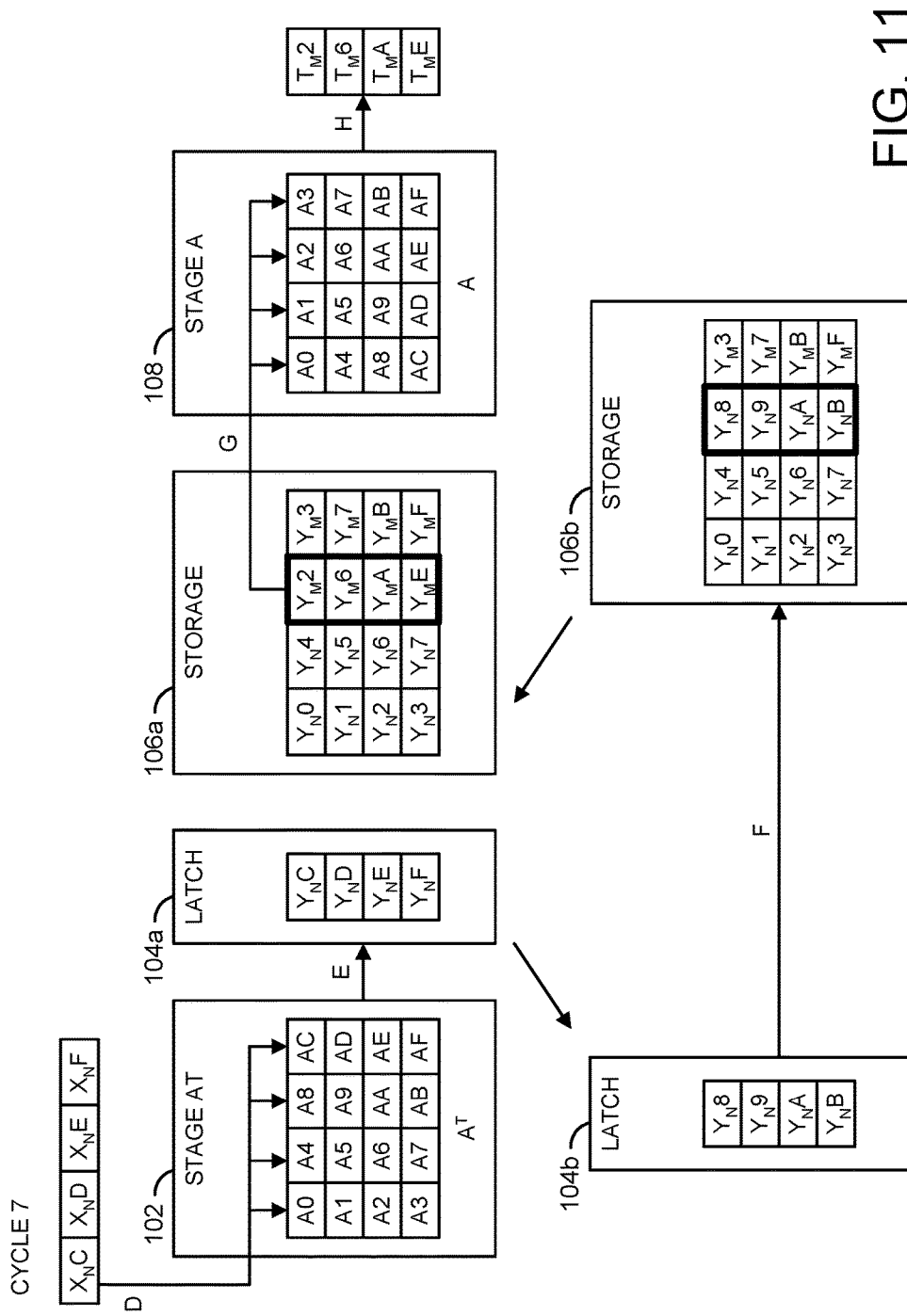
FIG. 11 is a diagram illustrating a cycle 7.

Referring to FIG. 11, a diagram illustrating another cycle (e.g., cycle 7) of the transformation is shown. At a start the cycle 7, a fourth (last) row of the matrix $X_N$ is received and processed by the circuit 102. At the start of the cycle 7, the first two columns of the circuit 106 (106a) store the first two rows of the intermediate matrix $Y_N$. The last two columns of the circuit 106 (106a) store the last two columns of the matrix $Y_M$. At the start of the cycle 7, a third column of the intermediate matrix $Y_M$ is read from the third column of the circuit 106 and transferred to the circuit 108.

During the cycle 7, the third row of the matrix $Y_N$ is written from the circuit 104 (104b) into a third column of the circuit 106 (106b). By the end of the cycle 7, a final row of the intermediate matrix $Y_N$ is generated by the circuit 102 and stored in the circuit 104 (104a). Therefore, all stage AT processing of the matrix $X_N$ may be completed by the end of the cycle 7. Furthermore, a third column of the transform matrix $T_M$ is generated by the stage A operations. The third column of the matrix $T_M$ may be calculated in cycle 7 per formulae 13 as follows:

$$T_M2 = Y_M2*A0 + Y_M6*A1 + Y_MA*A2 + Y_ME*A3 \qquad (13)$$

$$T_M6 = Y_M2*A4 + Y_M6*A5 + Y_MA*A6 + Y_ME*A7$$

$$T_MA = Y_M2*A8 + Y_M6*A9 + Y_MA*AA + Y_ME*AB$$

$$T_ME = Y_M2*AC + Y_M6*AD + Y_MA*AE + Y_ME*AF$$

Figure 12:
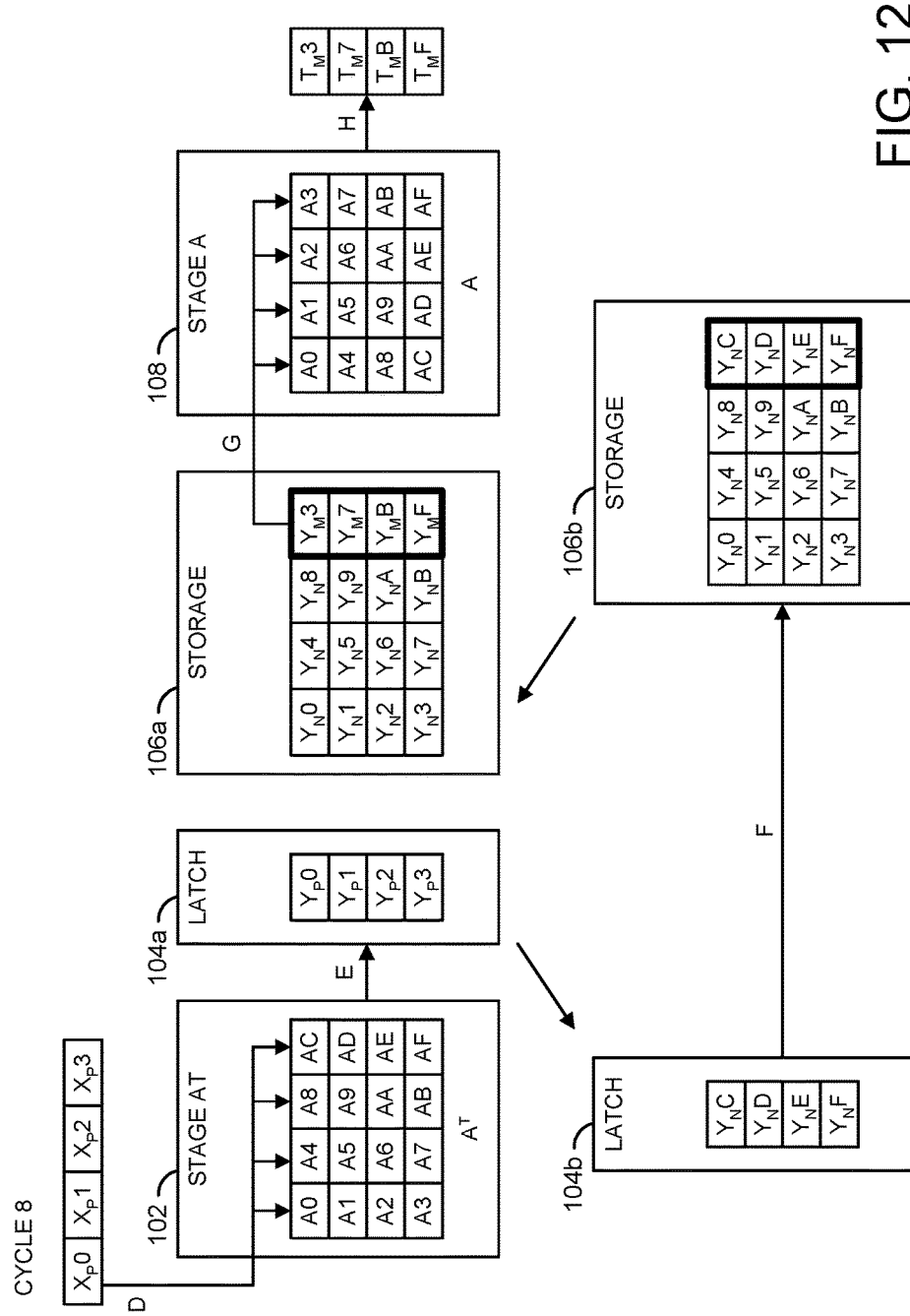
FIG. 12 is a diagram illustrating a cycle 8.

Referring to FIG. 12, a diagram illustrating another cycle (e.g., cycle 8) of the transformation is shown. At a start the cycle 8, a first (initial) row of another original matrix $X_P$ is received and processed by the circuit 102. At the start of the cycle 8, the first three columns of the circuit 106 (106a) store the first three rows of the intermediate matrix $Y_N$. The last column of the circuit 106 (106a) may store the last column of the matrix $Y_M$. At the start of the cycle 8, a fourth column of the intermediate matrix $Y_M$ is read from the fourth column of the circuit 106 and transferred to the circuit 108.

During the cycle 8, the fourth row of the matrix $Y_N$ is written from the circuit 104 (104b) into the fourth column of the circuit 106 (106b). Therefore, all of the rows of the matrix $Y_M$ and the matrix $Y_N$ may be written in consecutive cycles into the circuit 106.

By the end of the cycle 8, a first row of the intermediate matrix $Y_P$ is generated by the circuit 102 and stored in the circuit 104 (104a). Furthermore, a fourth (last) column of the transform matrix $T_M$ is generated by the stage A operations. Thus, the entire transform matrix $T_M$ is generated by the end of the cycle 8. The fourth row of the matrix $T_M$ may be calculated in cycle 8 per formulae 14 as follows:

$$T_M3 = Y_M3*A0 + Y_M7*A1 + Y_MB*A2 + Y_MF*A3 \qquad (14)$$

$$T_M7 = Y_M3*A4 + Y_M7*A5 + Y_MB*A6 + Y_MF*A7$$

$$T_MB = Y_M3*A8 + Y_M7*A9 + Y_MB*AA + Y_MF*AB$$

$$T_MF = Y_M3*AC + Y_M7*AD + Y_MB*AE + Y_MF*AF$$

The stage AT operations performed by the circuit 102 are generally complete at the end of the cycle 8 for the matrix $X_N$. The stage A operations performed by the circuit 108 may be complete at the end of the cycle 8 for the matrix $Y_M$. No bubbles (e.g., gaps or stalls in the processing) may exist in the stage AT operations and/or the stage A operations. The intermediate matrix $Y_M$ may be read from the circuit 106 in the column order. The intermediate matrix $Y_N$ is generally written into the circuit 106 in the column order.

Figure 13:
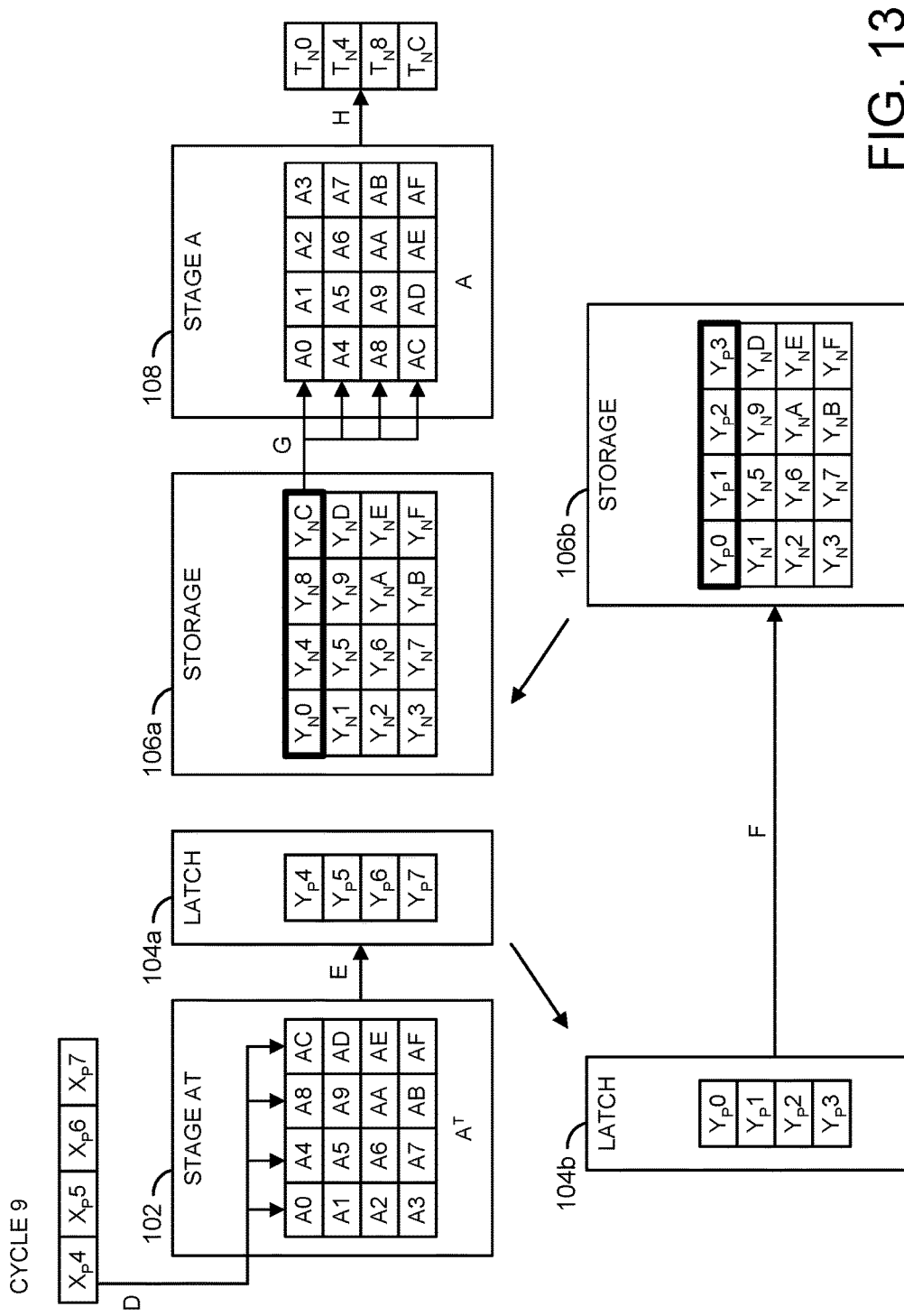
FIG. 13 is a diagram illustrating a cycle 9.

Referring to FIG. 13, a diagram illustrating another cycle (e.g., cycle 9) of the transformation is shown. At a start the cycle 9, a second row of the matrix $X_P$ is received and processed by the circuit 102. At the start of the cycle 9, the entire matrix $Y_N$ is already stored in the circuit 106 (106a). Reading from the circuit 106 generally changes from the column order for the matrix $Y_M$ to the row order for the matrix $Y_N$. At the start of the cycle 9, a first column of the matrix $Y_N$ is read from the first (top) row of the circuit 106 and transferred to the circuit 108.

Writing to the circuit 106 generally changes from the column order for the matrix $Y_N$ to the row order for the matrix $Y_P$. During the cycle 9, the first row of the matrix $Y_P$ is written from the circuit 104 (104*b*) into the first row of the circuit 106 (106*b*).

By the end of the cycle 9, a second row of the intermediate matrix $Y_P$ is generated by the circuit 102 and stored in the circuit 104 (104*a*). Furthermore, a first column of the transform matrix $T_N$ is generated by the stage A operations by the end of the cycle 9. The first column of the matrix $T_N$ may be calculated in cycle 9 per formulae 15 as follows:

$$T_N0 = Y_N0*A0 + Y_N4*A4 + Y_N8*A8 + Y_NC*AC \quad (15)$$

$$T_N4 = Y_N0*A1 + Y_N4*A4 + Y_N8*A9 + Y_NC*AD$$

$$T_N8 = Y_N0*A2 + Y_N4*A6 + Y_N8*AA + Y_NC*AE$$

$$T_NC = Y_N0*A3 + Y_N4*A7 + Y_N8*AB + Y_NC*AF$$

Typical addressing of a memory to buffer the intermediate matrix elements commonly results in bubbles in the transform processing. Table 1 generally illustrates analytical measures for performance in a case of single buffer with a conventional single bank of buffering. The value K may be a number of rows simultaneously read from memory.

TABLE 1

| Transform size | No. of cycles to process one block | No. of cycles to process one block if write and read overlap in last cycle | No. of cycles to process in the circuit 100 |
|---|---|---|---|
| K = 1 | | | |
| 4 × 4 | 8 | 7 | 4 |
| 8 × 8 | 16 | 15 | 8 |
| 16 × 16 | 32 | 31 | 16 |
| 32 × 32 | 64 | 63 | 32 |
| K = 2 | | | |
| 4 × 4 | 4 | 3 | 2 |
| 8 × 8 | 8 | 7 | 4 |
| 16 × 16 | 16 | 15 | 8 |
| 32 × 32 | 32 | 31 | 16 |
| K = 4 | | | |
| 4 × 4 | 2 | 1 | 1 |
| 8 × 8 | 4 | 3 | 2 |
| 16 × 16 | 8 | 7 | 4 |
| 32 × 32 | 16 | 15 | 8 |
| K = 8 | | | |
| 4 × 4 | n/a | n/a | n/a |
| 8 × 8 | 1 | 1 | 1 |
| 16 × 16 | 4 | 3 | 2 |
| 32 × 32 | 8 | 7 | 4 |

To increase the throughput in the conventional methods, two buffers are utilized. The transform operations thus ping pong between the two buffers to achieve 100 percent throughput. Table 2 generally illustrates a comparison of buffer sizes. A unit of storage in Table 2 is the number of bits used to store one coefficient after one direction of transform (either horizontal or vertical depending upon the implementation). The number of bits in a single coefficient depends upon the number of bits used to represent the matrix X and the matrix A and the size of the transform.

TABLE 2

| Transform size | Buffer size in 2 bank conventional scheme (in units) | Buffer size in the circuit 100 (in units) |
|---|---|---|
| 4 × 4 | 32 | 16 |
| 8 × 8 | 128 | 64 |
| 16 × 16 | 512 | 256 |
| 32 × 32 | 2048 | 1024 |

The circuit 100 generally achieves 100 percent throughput with single bank buffer. Therefore, the circuit 100 saves in terms of area and power over common transform designs in the cases of higher transform sizes. For example, with a 32×32 transform size and 16 bits per unit, the present invention may reduce the buffer by 32*32*16=16,384 bits.

The functions and structures illustrated in the diagrams of FIGS. 1-13 may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a first circuit configured to (i) generate a sequence of intermediate matrices by multiplying a sequence of original matrices by a predetermined matrix and (ii) write said intermediate matrices into a memory in a first order that alternates between a row order while processing a first of said original matrices and a column order while processing a second of said original matrices; and
    a second circuit configured to read a plurality of elements of said intermediate matrices from said memory in a second order that alternates between said column order while accessing said intermediate matrices generated from said first original matrix and said row order while accessing said intermediate matrices generated from said second original matrix.

2. The apparatus according to claim 1, wherein (i) one of said intermediate matrices is generated in said first circuit in each of a plurality of cycles and (ii) each of said intermediate matrices is stored in said memory as either a row matrix or a column matrix.

3. The apparatus according to claim 1, wherein said memory is configured to both (i) read a row or a column of said elements and (ii) write one of said intermediate matrices in each of a plurality of cycles.

4. The apparatus according to claim 1, wherein at least two of said intermediate matrices are written into said memory in consecutive ones of a plurality of cycles.

5. The apparatus according to claim 1, further comprising a third circuit configured to latch each of said intermediate matrices prior to said write into said memory.

6. The apparatus according to claim 1, wherein said second circuit is further configured to generate a transform matrix by multiplying said elements read from said memory by another predetermined matrix.

7. The apparatus according to claim 6, wherein said predetermined matrix and said another predetermined matrix transform data in said original matrices either (i) from a spatial domain to a frequency domain or (ii) from said frequency domain to said spatial domain.

8. A method for transform with minimum buffering, comprising the steps of:
    generating a sequence of intermediate matrices by multiplying a sequence of original matrices by a predetermined matrix in a circuit;
    writing said intermediate matrices into a memory in a first order that alternates between a row order while processing a first of said original matrices and a column order while processing a second of said original matrices; and
    reading a plurality of elements of said intermediate matrices from said memory in a second order that alternates between said column order while accessing said intermediate matrices generated from said first original matrix and said row order while accessing said intermediate matrices generated from said second original matrix.

9. The method according to claim 8, wherein (i) one of said intermediate matrices is generated in said circuit in each of a plurality of cycles and (ii) each of said intermediate matrices is stored in said memory as either a row matrix or a column matrix.

10. The method according to claim 8, wherein said memory is configured to both (i) read a row or a column of said elements and (ii) write one of said intermediate matrices in each of a plurality of cycles.

11. The method according to claim 8, wherein at least two of said intermediate matrices are written into said memory in consecutive ones of a plurality of cycles.

12. The method according to claim 8, further comprising the step of:
    latching each of said intermediate matrices prior to writing into said memory.

13. The method according to claim 8, further comprising the step of:
    generating a transform matrix by multiplying said elements read from said memory by another predetermined matrix.

14. The method according to claim 13, wherein said predetermined matrix and said another predetermined matrix transform data in said original matrices either (i) from a spatial domain to a frequency domain or (ii) from said frequency domain to said spatial domain.

15. An apparatus comprising:
    a first circuit configured to write a sequence of intermediate matrices created from a sequence of original matrices into a memory in a first order that alternates between a row order while processing a first of said original matrices and a column order while processing a second of said original matrices; and
    a second circuit configured to (i) read a plurality of elements of said intermediate matrices from said memory in a second order that alternates between said column order while accessing said intermediate matrices created from said first original matrix and said row order while accessing said intermediate matrices created from said second original matrix and (ii) generate a transform matrix by multiplying said elements read from said memory by a predetermined matrix.

16. The apparatus according to claim 15, wherein (i) one of said intermediate matrices is generated in said first circuit in each of a plurality of cycles and (ii) each of said intermediate matrices is stored in said memory as either a row matrix or a column matrix.

17. The apparatus according to claim 15, wherein said memory is configured to both (i) read a row or a column of said elements and (ii) write one of said intermediate matrices in each of a plurality of cycles.

18. The apparatus according to claim 15, wherein at least two of said intermediate matrices are written into said memory in consecutive ones of a plurality of cycles.

19. The apparatus according to claim 15, wherein said first circuit is further configured to generate said intermediate matrices based on said original matrices and another predetermined matrix.

20. The apparatus according to claim 19, wherein said predetermined matrix and said another predetermined matrix transform data in said original matrices either (i) from a spatial domain to a frequency domain or (ii) from said frequency domain to said spatial domain.

* * * * *